US005110255A

United States Patent [19]

LeBan et al.

[11] Patent Number: 5,110,255

[45] Date of Patent: May 5, 1992

[54] CONNECTOR FEEDING APPARATUS FOR A CONNECTOR TERMINATION PRESS

[75] Inventors: Joseph F. LeBan, Warrenville; Robert F. Levin, Braceville, both of Ill.

[73] Assignee: Panduit Corp., Tinley Park, Ill.

[21] Appl. No.: 733,050

[22] Filed: Jul. 19, 1991

[51] Int. Cl.$^5$ .............................................. B25J 11/00

[52] U.S. Cl. .................................. 414/754; 414/761; 414/765; 198/408; 29/753; 29/759

[58] Field of Search .................. 29/753, 759; 414/754, 414/761, 765; 198/404, 408, 345.2, 479.1, 468.11

[56] References Cited

U.S. PATENT DOCUMENTS

| | | | |
|---|---|---|---|
| 3,114,199 | 12/1963 | Flodberg | 29/759 |
| 3,140,010 | 7/1964 | Double | 221/73 |
| 3,780,848 | 12/1973 | Studeny | 198/479.1 |
| 3,911,646 | 10/1975 | Larkin et al. | 53/240 |
| 4,043,034 | 8/1977 | Sucheski et al. | 29/749 |
| 4,055,889 | 11/1977 | Fusco et al. | 29/710 |
| 4,128,174 | 12/1978 | Frisbie et al. | 198/408 |
| 4,148,118 | 4/1979 | Fleischhacker et al. | 29/33 K |
| 4,519,129 | 5/1985 | Caveney et al. | 29/753 |
| 4,554,733 | 11/1985 | Caveney | 29/749 |
| 4,579,414 | 4/1986 | Caveney et al. | |
| 4,607,761 | 8/1986 | Wright et al. | 221/25 |
| 4,671,707 | 6/1987 | Vancelette et al. | 29/759 |
| 4,690,302 | 9/1987 | Zebley et al. | 221/11 |
| 4,768,641 | 9/1988 | Hibi et al. | 198/408 |

FOREIGN PATENT DOCUMENTS

| | | | |
|---|---|---|---|
| 157126 | 7/1987 | Japan | 198/408 |

*Primary Examiner*—P. W. Echols

*Attorney, Agent, or Firm*—Charles R. Wentzel; Mark D. Hilliard

[57] ABSTRACT

An apparatus for feeding an electrical connector to a connector termination press includes a slotted rotary drum that receives the leading connector from a ribbon of taped connectors carried on a reel, rotates the connector ninety degrees to reorient the connector and places it in a connector positioning track, and a push rod assembly that advances the connector into an aligned position underneath the ram of a connector termination press.

5 Claims, 9 Drawing Sheets

CONNECTOR FEEDING APPARATUS FOR A CONNECTOR TERMINATION PRESS

TECHNICAL FIELD

The present invention relates generally to a connector feeding apparatus for orienting and sequentially presenting individual connectors to a connector termination press and specifically relates to an apparatus that removes individual connectors from a reel of taped connectors and sequentially orients each individual connector and accurately positions the connector in a connector termination press.

BACKGROUND ART

The provision of a plurality of connectors secured to a tape strip to form a taped ribbon of connectors for application in a connector harness assembly machine is known in the art as suggested in U.S. Pat. No. 4,043,034 and U.S. Pat. No. 4,055,889.

It has also been suggested that a feed wheel could be utilized to strip taped components from a tape strip to dispense the components into a bag for packaging. Reference may be made to U.S. Pat. No. 3,911,646.

None of these prior machines provide for sequential reorientation and accurate positioning of each connector within a connector termination press allowing rapid and accurate termination of a plurality of tape mounted connectors.

SUMMARY OF THE INVENTION

The object of the present invention is to provide a connector feeding apparatus for a connector termination press that can accurately and rapidly obtain individual connectors from a source of a plurality of connectors, reorient and sequentially accurately position each connector for termination in the connector termination press.

In general a connector feeding apparatus includes a connector supply means for providing a plurality of connectors in a first orientation, a drum for sequentially reorienting each connector from the first orientation where the connector is not properly oriented for termination within a connector terminator press to a second orientation where the connector is properly oriented for termination within a connector termination press, the drum including at least one connector positioning slot for receipt of the connector, and means for rotating the drum to reorient each connector from the first to the second orientation.

DESCRIPTION OF THE PREFERRED EMBODIMENT

Figure 1:
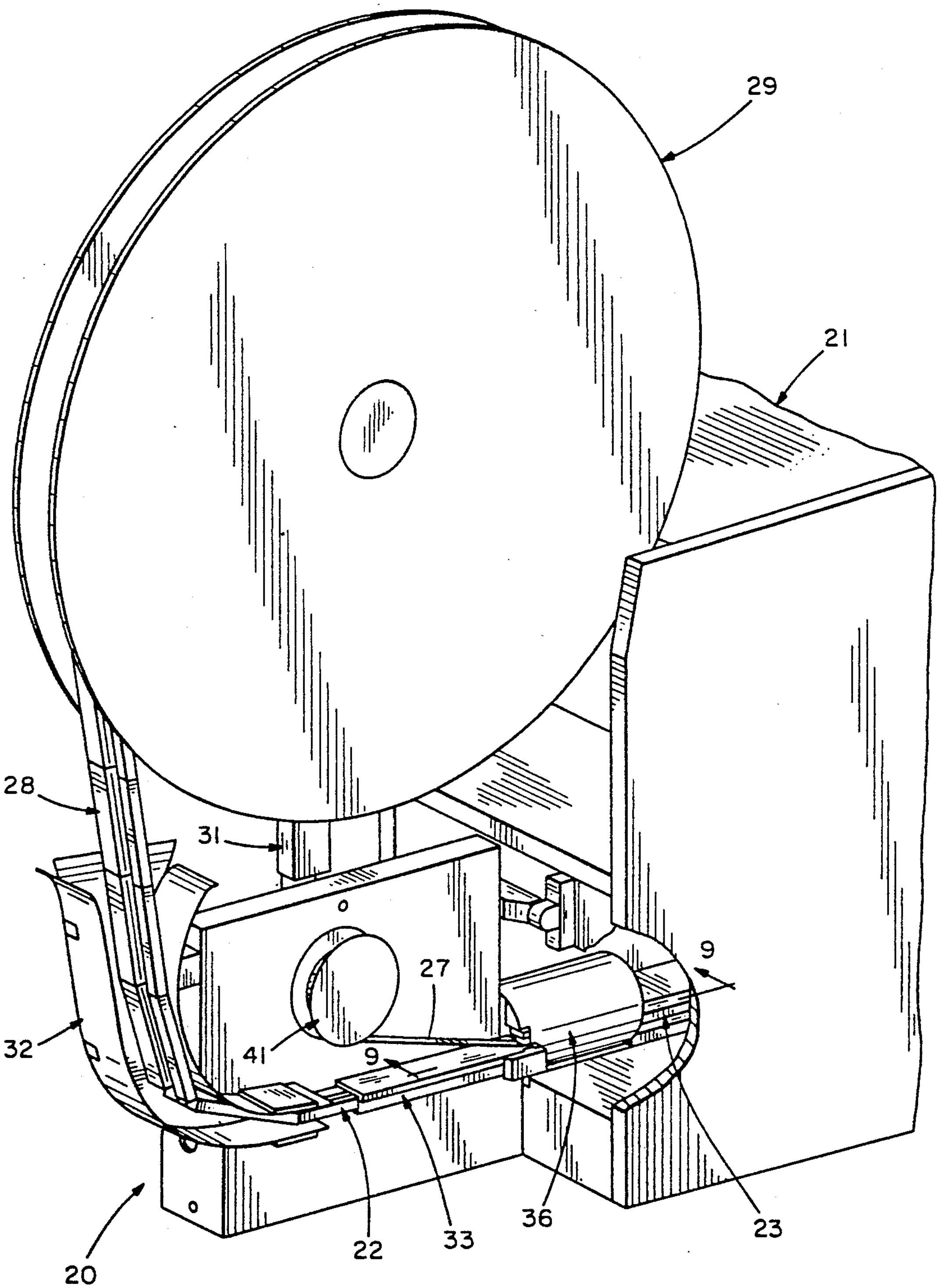
FIG. 1 is a perspective view of a connector feeding apparatus embodying the concept of the present invention shown mounted to a connector termination press.
Figure 2:
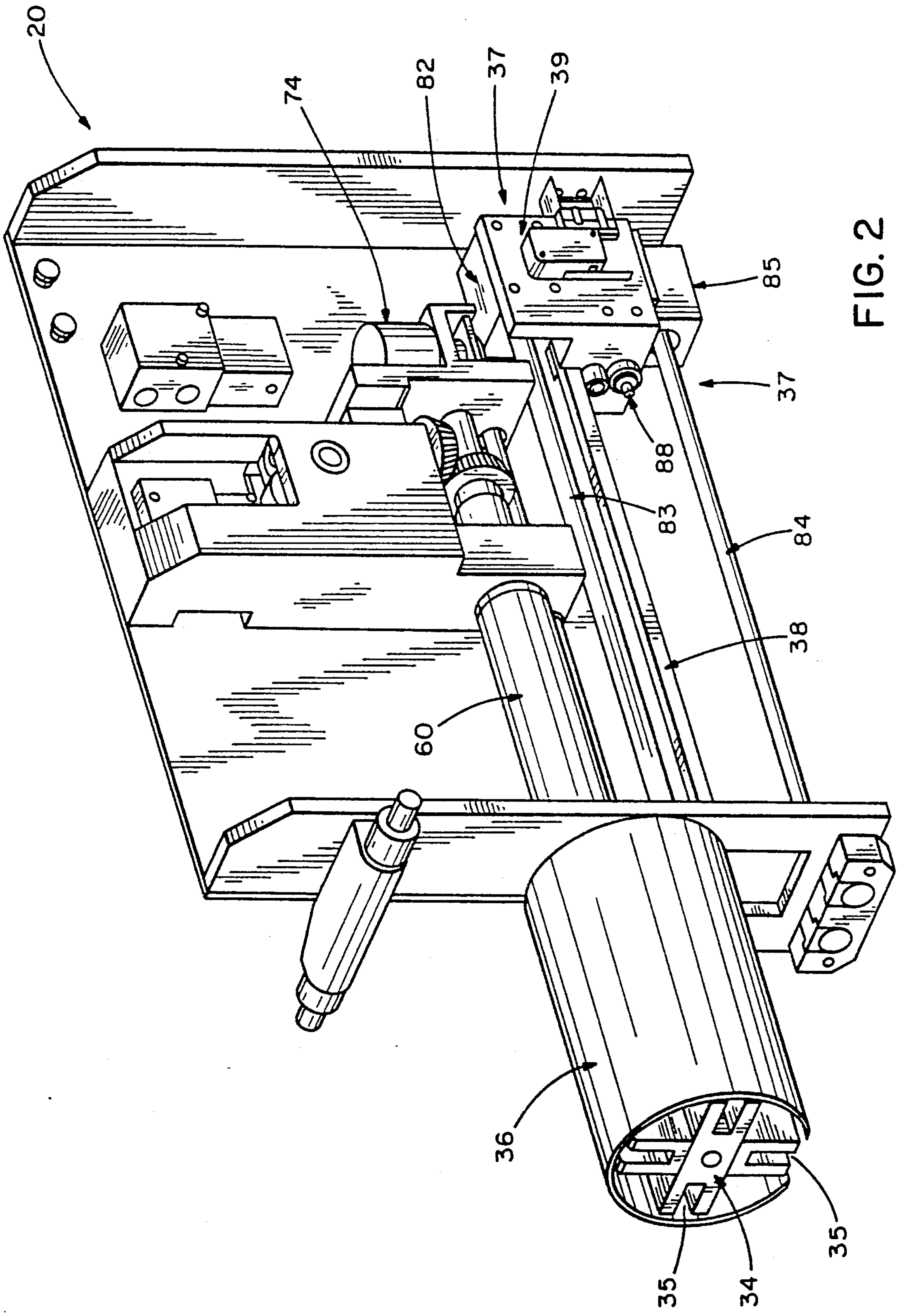
FIG. 2 is a perspective view of the internal mechanism of the connector feeding apparatus of FIG. 1.

A connector feeding apparatus for a connector termination press embodying the concept of the present invention is designated generally by the numeral 20 in the accompanying drawings. Apparatus 20 is removably mounted to a connector termination press 21, see FIGS. 1 and 11. Apparatus 20 sequentially places properly oriented individual connectors 22 in a connector positioning track 23 of press 21 and accurately advances each connector 22 to a termination position, shown in FIG. 11, underneath the reciprocating ram 24 of press 21. The features of connectors 22 and the general operational features of press 21 are described in detail in U.S. Pat. No. 4,579,414 and U.S. Pat. No. 4,554,733 which are both incorporated herein by reference. Connectors 22 are preferably provided to apparatus 20 secured to a strip of adhesive tape 27 to form a connector ribbon 28. Connector ribbon 28 is coiled in a continuous length on a reel 29.

Figure 6:
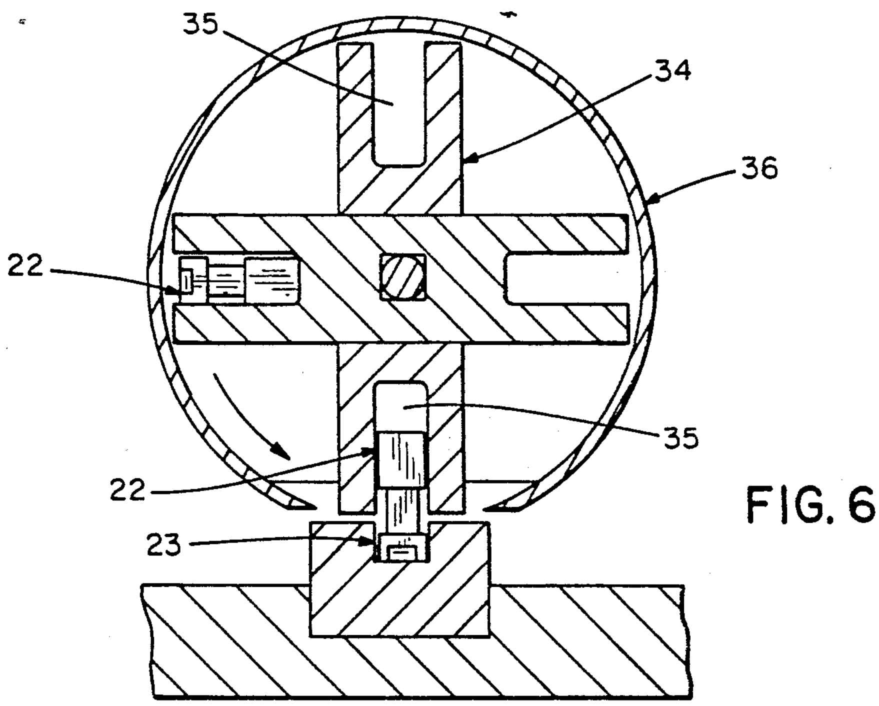
FIG. 6 is a fragmentary sectional view taken along line 6—6 of FIG. 5.

Connector feeding apparatus 20 includes a reel support arm 31 which rotatably supports reel 29, a connector ribbon funnel guide 32 which initially positions and guides ribbon 28 from a generally vertical into a horizontal disposition, a connector guide channel 33 which receives and accurately aligns each connector 22, a connector orienting drum 34 which receives each connector from the guide channel 33 in a connector positioning slot 35 enclosed with drum cover 36 and reorients each connector ninety degrees, from a horizontal disposition to a vertical disposition seated in track 23 of press 21, as seen in FIG. 6, a connector push rod assembly 37 which includes a push rod 38 reciprocatingly driven by a push rod carriage 39, and a tape take-up assembly 40 which rotates a tape take-up spool 41 to withdraw tape 27 from connector ribbon 28 and advance the leading connector of ribbon 28 forward.

Figure 3:
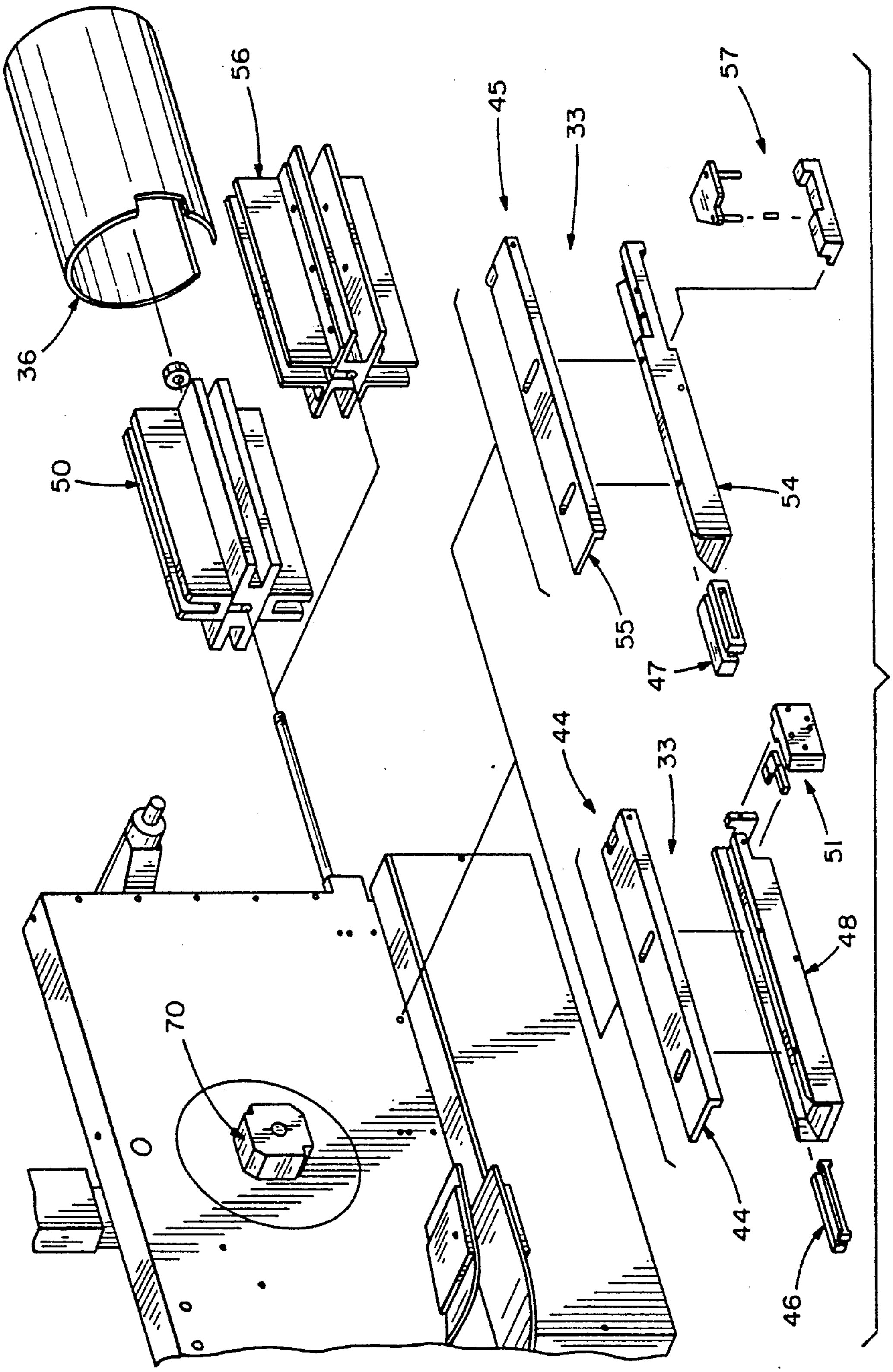
FIG. 3 is an exploded perspective view of the connector feeding apparatus of FIG. 1 showing interchangeable modular assemblies for feeding a socket connector or an edge card connector.

As seen in FIG. 3, apparatus 20 includes socket connector and edge card connector modular, interchangeable assemblies 44 and 45 that are configured to respectively accommodate socket and edge card connectors 46 and 47. Socket connector modular assembly 44 includes a connector guide channel 33 having a slotted base 48 and a cover 49, a socket connector drum 50 and a socket connector sensor switch 51, all of which are specially configured and dimensioned to accurately position socket connector 46. Edge card connector modular assembly 45 includes a connector guide channel 33 having a slotted base 54 and a cover 45, an edge card connector drum 56 and an edge card connector sensor switch 57, all of which are specially configured and dimensioned to accurately position edge card connector 47. Drum cover 36 can be used with either socket or edge card connector drums 50 or 56.

Figure 4:
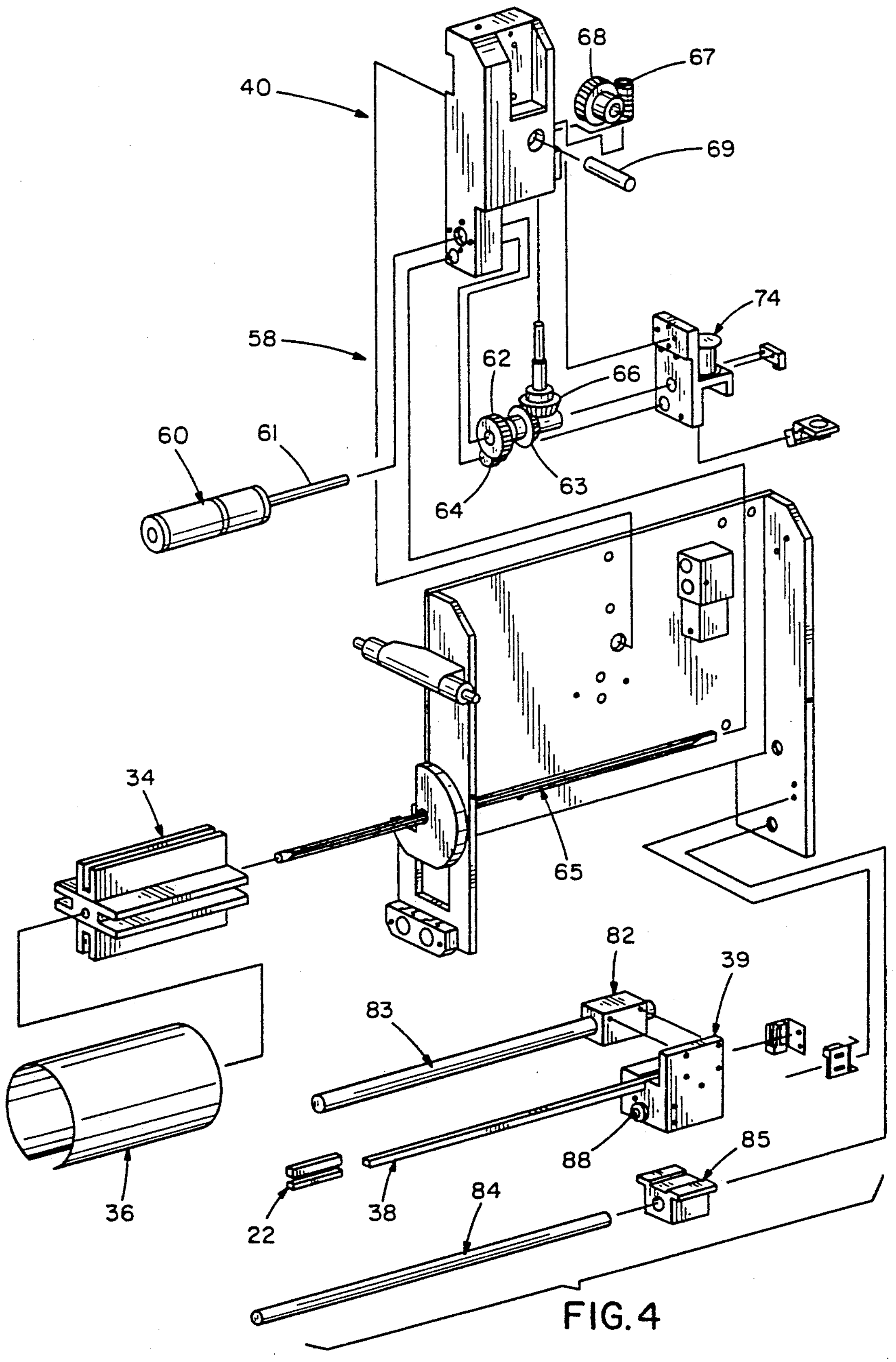
FIG. 4 is an exploded perspective view of the internal mechanism of the connector feeding apparatus of FIG. 1.
Figure 5:
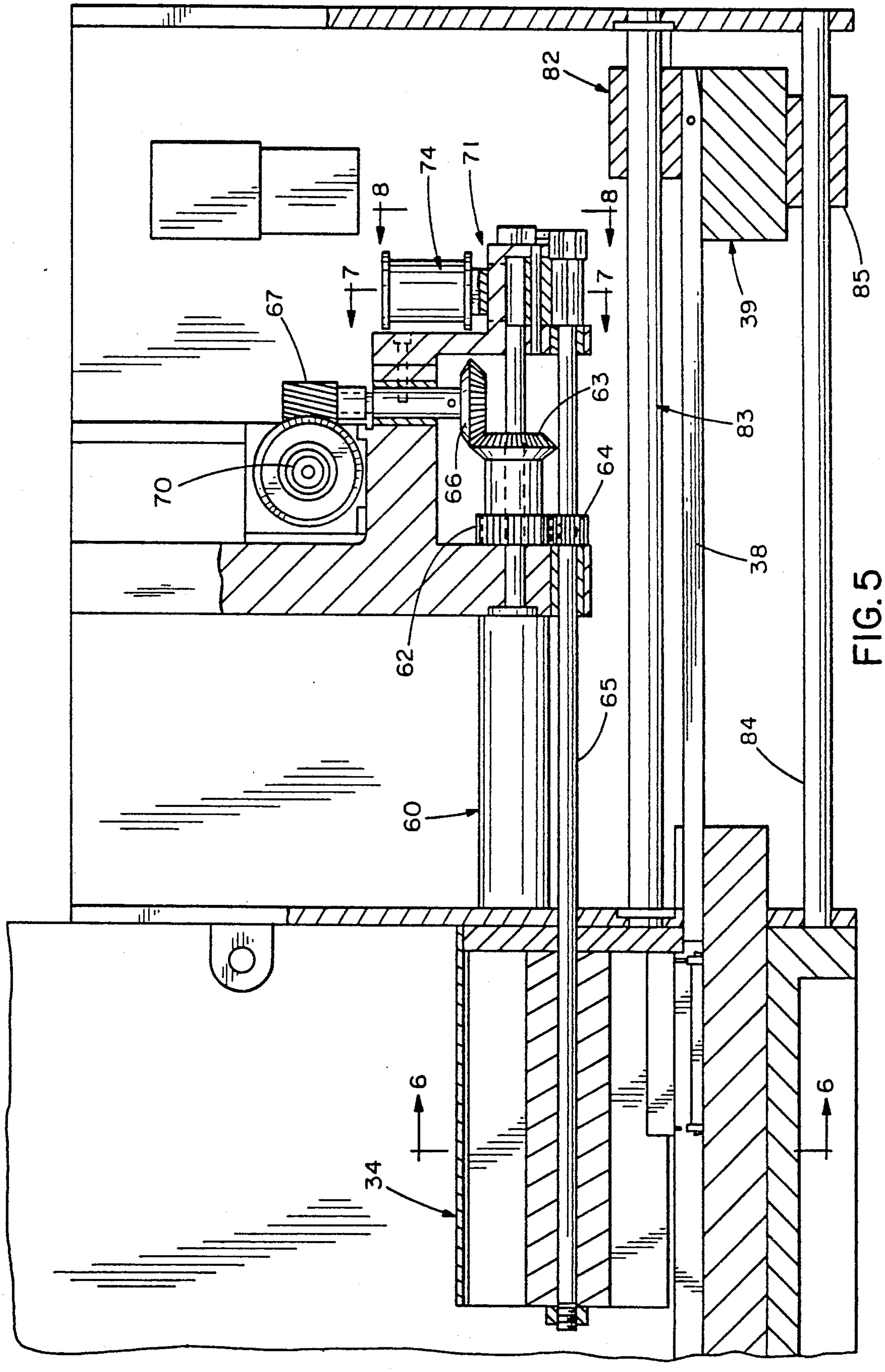
FIG. 5 is a fragmentary sectional view of the internal mechanism of the connector feeding apparatus of FIG. 1.

A gear assembly 58, best seen in FIGS. 4 and 5, is driven by a reversible electric motor 60 that selectively rotates a shaft 61, which carries a drum drive gear 62 and tape take-up drive gear 63, in opposite directions. Each gear 62 and 63 are secured to shaft 61 by an oppositely directed one directional drive press fit such that rotation of shaft 61 in one direction drives gear 62 but does not drive gear 63 while counter rotation of shaft drives gear 63 but does not drive gear 62, thus allowing a single reversible motor 60 to drive either tape take-up spool 41 or drum 34.

Drum drive gear 62 drives intermediate gear 64 which is secured to drum shaft 65 which carries drum 34. Tape take-up drive gear 63 drives interconnecting tape take-up gears 66, 67 and 68 which drive shaft 69 carrying tape take-up hub 70. Hub 70 mounts tape take-up spool 41, see FIG. 1.

Figure 7:
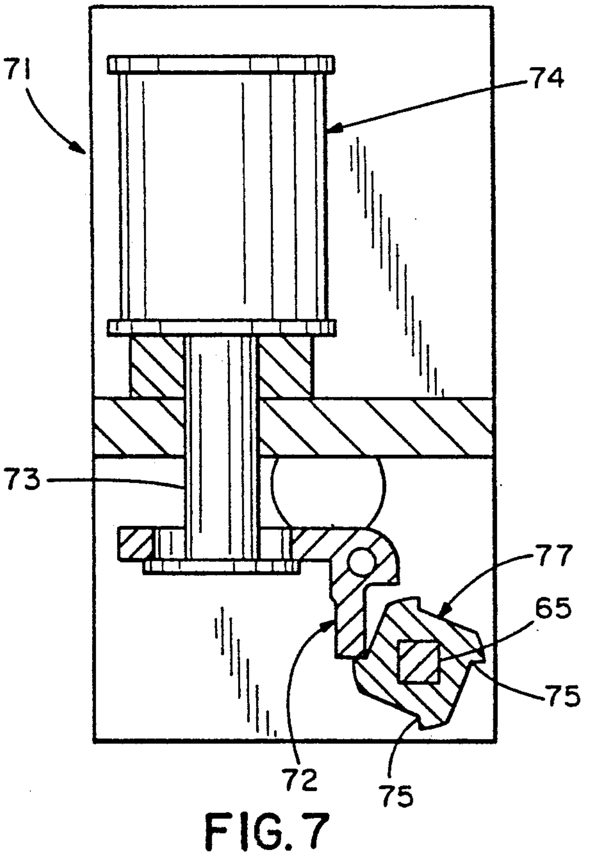
FIG. 7 is a sectional view taken along line 7—7 of FIG. 5.

As best seen in FIGS. 5 and 7, a positive drum location assembly 71 includes a drum ratchet pawl 72 carried on shaft 73 of an electric solenoid actuator 74 which selectively reciprocates pawl 72 into and out of engagement with one of four grooves 75 in a ratchet wheel 77 carried on the end of drum shaft 65. Positive drum location assembly 71 positively and accurately locates each connector positioning slot 35 in drum 34 in an accurately aligned position with connector guide channel 33 by accurately aligning drum shaft 65 in one of four distinct positions ninety degrees apart by engagement of pawl 72 with each respective groove 75.

Figure 8:
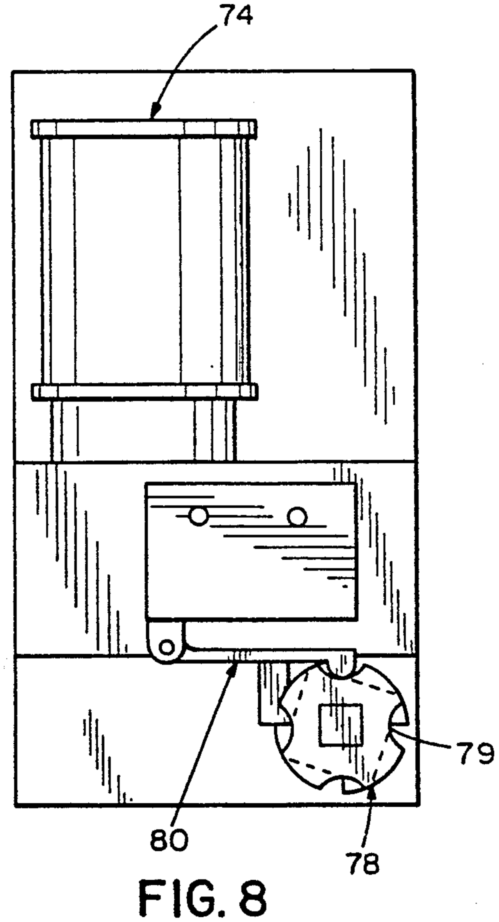
FIG. 8 is a sectional view taken along line 8—8 of FIG. 5.

As best seen in FIG. 8 drum shaft 65 carries drum location wheel 78 that presents four grooves 79 equally spaced around the circumference of wheel 78. Drum location switch 80 is disposed to sequentially engage each groove 79 to provide a signal identifying the location of shaft 65 and thus slots 35 in drum 34.

Referring now to FIGS, 2, 4 and 5, connector push rod assembly 37 includes push rod 38 carried by push rod carriage 39 which is fastened to and driven by a reciprocating drive member 82 of a rodless pneumatic cylinder 83. A guide rod 84 is received through a bore in a positioning slide block 85 which is fastened to carriage 39 which accurately positions and supports carriage 39 and push rod 38.

Figure 9:
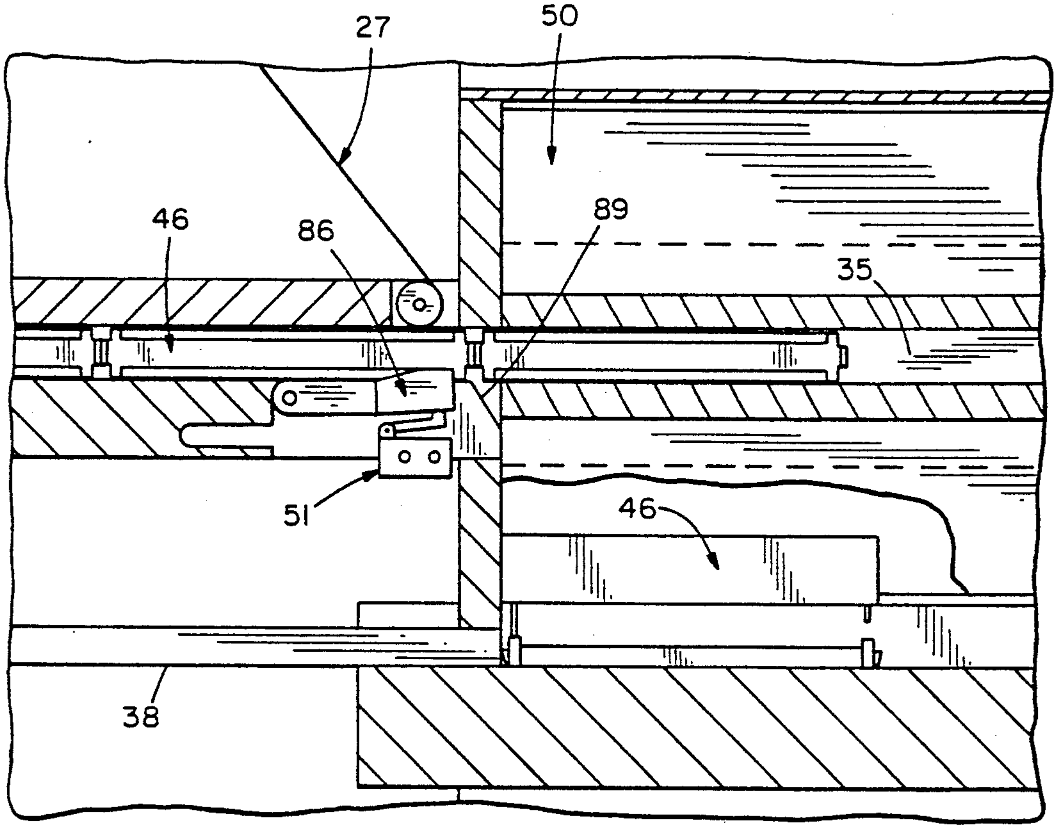
FIG. 9 is a fragmentary sectional view taken along line 9—9 of FIG. 1 showing a drum advance position of the drum with a socket connector positioned in the drum of the connector feed mechanism of FIG. 1.
Figure 10:
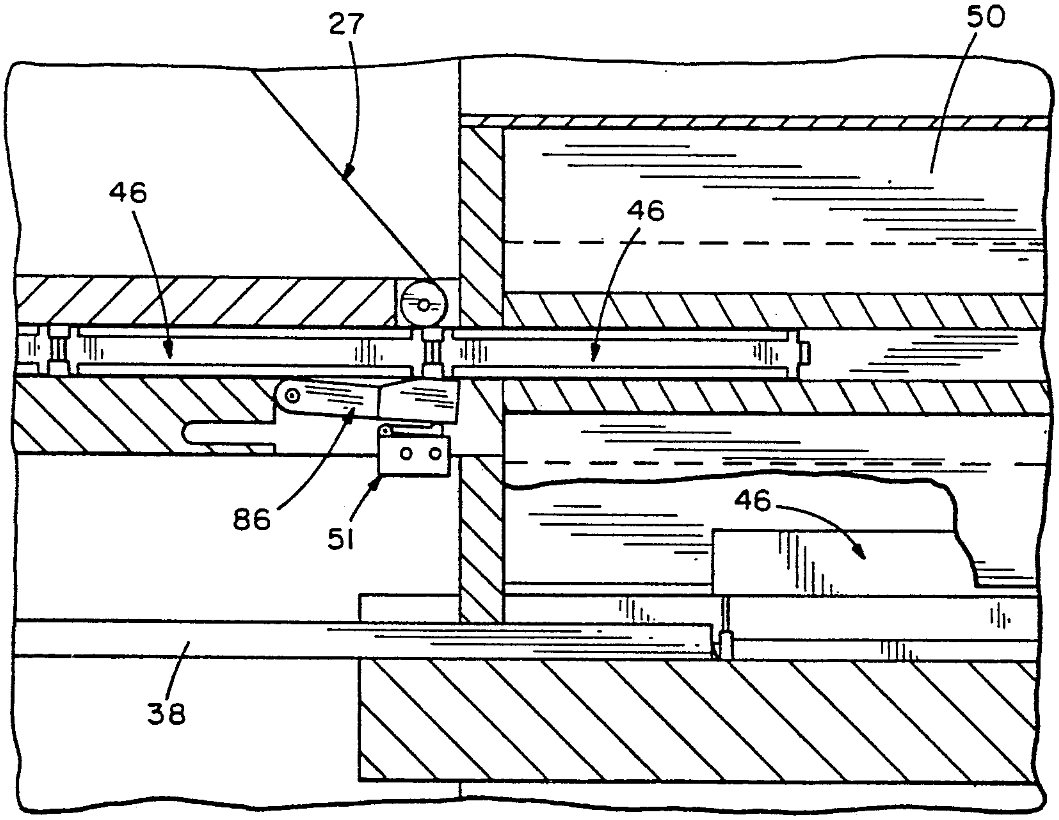
FIG. 10 is the fragmentary sectional view of FIG. 9 showing a connector advance position of the drum as the drum is held stationary and a socket connector is advanced into the drum.

As seen in FIGS. 9 and 10, a pivot arm 86 of socket connector sensor switch 51 is specially designed to sense the structural features of socket connector 46 to position connector 46 within a respective slot 35 of drum 34. FIG. 9 depicts socket connector 46 in a drum advance position with the leading connector 46 disposed within connector positioning slot 35 in a position ready to be rotated ninety degrees into position in connector positioning track 23. Angled guide surface 89 directs connector 46 into connector positioning slot 35 as drum 50 is rotated. FIG. 10 depicts socket connector 46 in a connector advance position as drum 50 is held stationary and the leading connector 46 is advanced into connector positioning slot 35.

Figure 12:
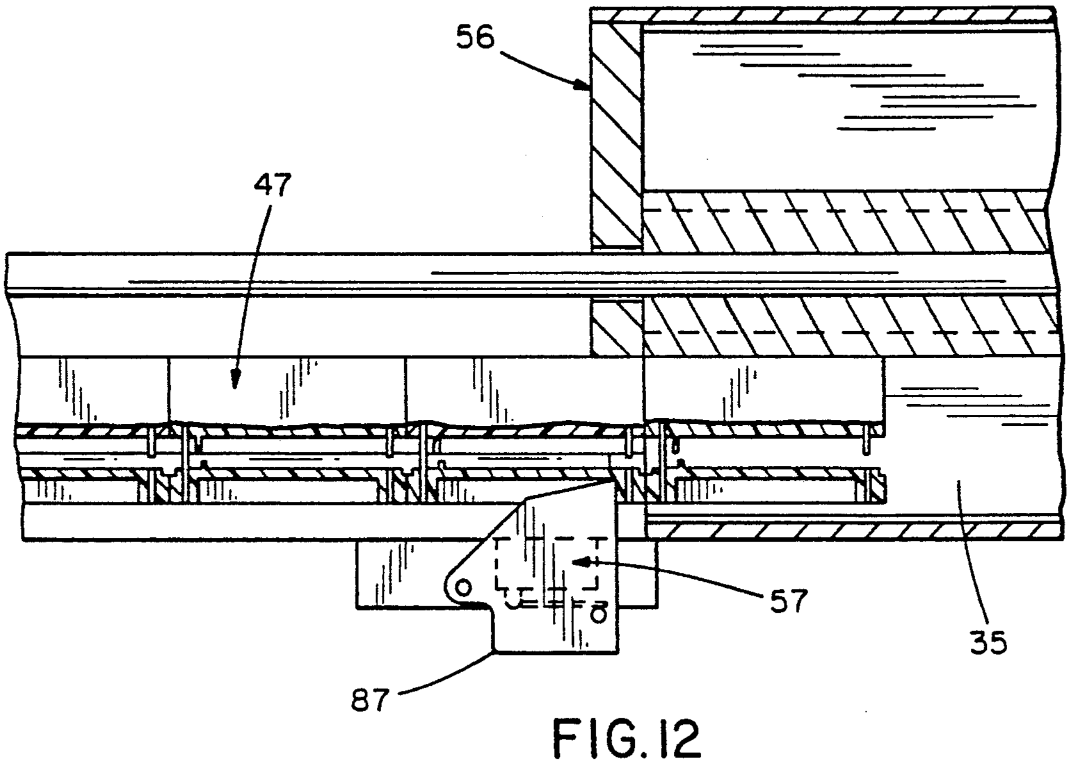
FIG. 12 is a fragmentary sectional view showing a drum advance position of an edge card connector drum with a connector positioned in the edge card connector drum of the connector feed mechanism of FIG. 1.
Figure 13:
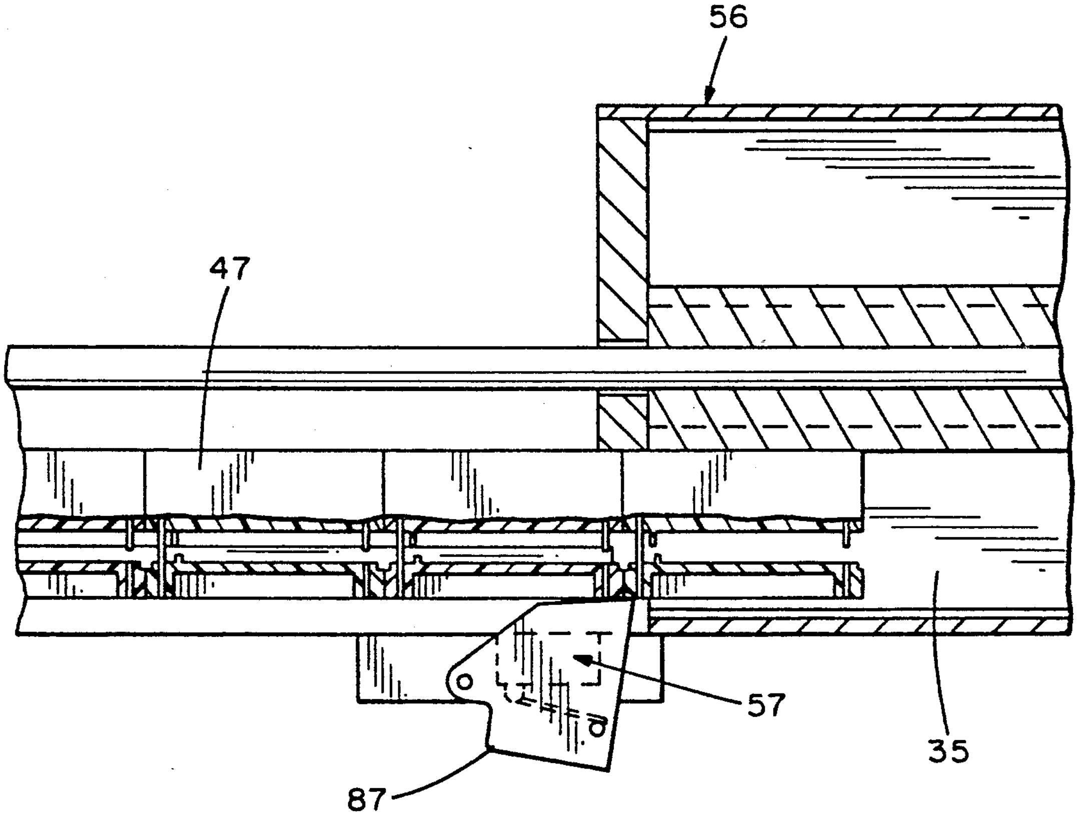
FIG. 13 is the fragmentary sectional view of FIG. 12 showing a connector advance position of the edge card connector drum as the drum is held stationary and the edge card connector is advanced into the drum.

As seen in FIGS. 12 and 13, a pivot arm 87 of edge card connector sensor switch 57 is specially designed to sense the structural features of edge card connector 47 to position connector 47 within a respective slot 35 of drum 56. FIG. 12 depicts edge card connector 47 in a drum advance position with the leading connector 47 disposed within connector positioning slot 35 in a position ready to be rotated ninety degrees into position in connector positioning track 23. FIG. 13 depicts edge card connector 47 in a connector advance position as drum 34 is held stationary and the leading connector 47 is advanced into connector positioning slot 35.

Connector feeding apparatus controlled by electronic and pneumatic control circuitry (not shown) operates in the following manner. Initially electric motor 60 is actuated to turn in a first direction which results in the rotation of tape take-up hub 70 and tape take-up spool 41 which strips tape 27 from the leading connector positioned in connector guide channel 33 and advances connector 22 into connector positioning slot 35. Depending upon the type of connector being fed, either socket connector sensor switch 51 or edge card connector switch 57 is actuated by the down and up movement of either pivot arm 86 or 87 engaging the structural features of the leading connector to stop electric motor from withdrawing tape 27. Solenoid actuator 74 is engaged to withdraw pawl 72 from groove 75 and reversible electric motor 60 is then actuated in the opposite direction resulting in the rotation of drum 34 and the lead connector carried in slot 35. During the drum rotation solenoid actuator 74 is disengaged allowing pawl 72 to eventually engage the next groove 75 positioned exactly ninety degrees from the initially engaged grooved 75, preventing free rotation of drum 34. The electronic control circuitry senses the rise in current in electric motor 60 caused by the increased torque induced in the electric motor by the engaged pawl 72 and ratchet wheel 77 and turns motor 60 off. Drum location switch 80 when engaged in one of grooves 79 of drum location wheel 78 provides a signal indicating drum 34 is properly positioned and allowing continued operation of apparatus 20 which ensures proper alignment of drum 34.

Figure 11:
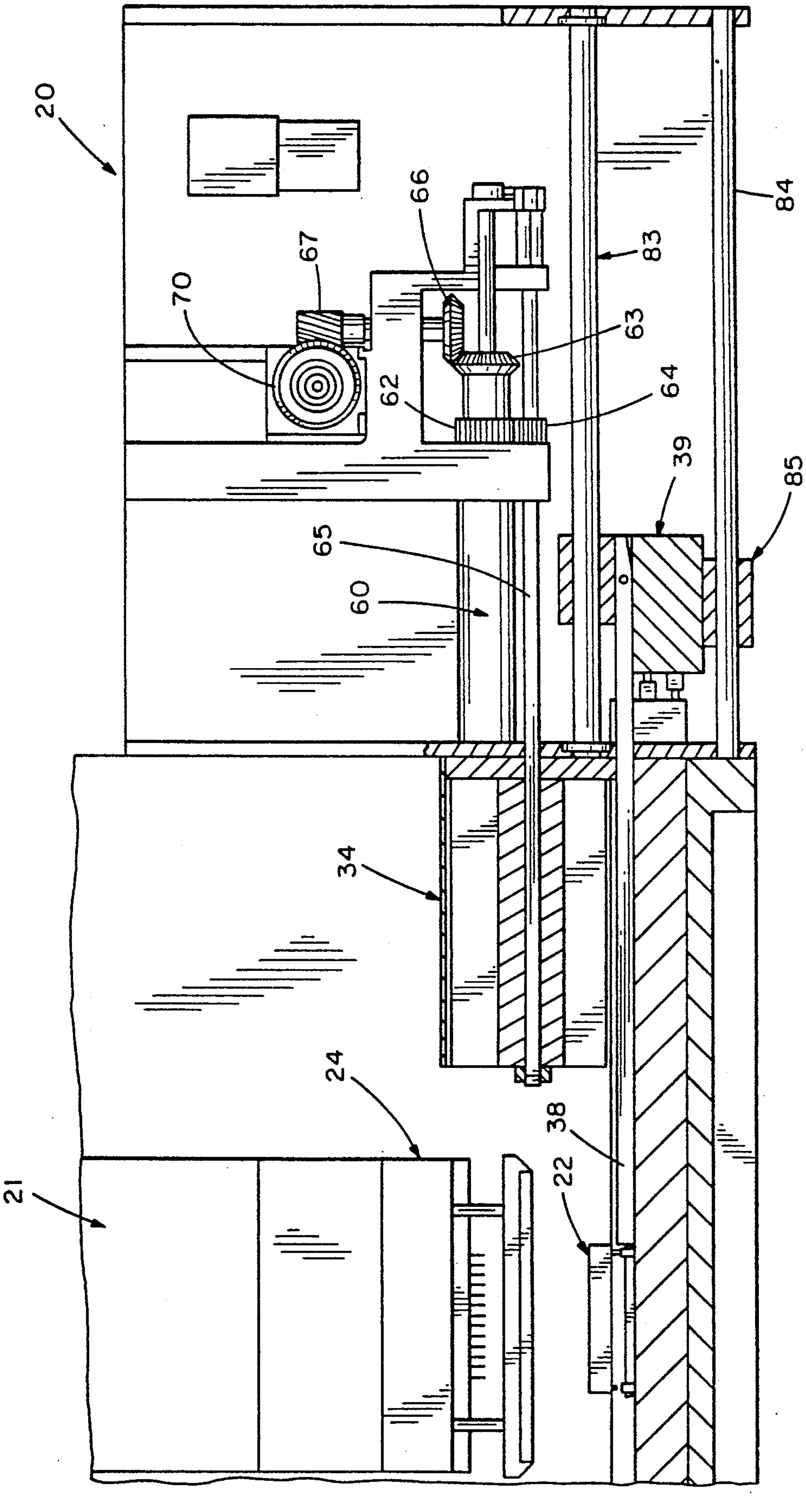
FIG. 11 is a fragmentary sectional view of the connector feeding mechanism of FIG. 1 in operative engagement with a connector application press.

Rodless pneumatic cylinder 83 is then actuated carrying push rod 38 forward and pushing the lead connector 22 into an aligned termination position under ram 24 of press 21, see FIG. 11. A switch 88 is positioned on the forward face of push rod carriage 39 which is actuated when push rod 38 reaches the proper termination position.

During the actuation of rodless pneumatic cylinder 83, the tape take-up is actuated as described above to strip the next connector 22 and place it in connector positioning slot 35.

As described above connector feeding apparatus thus can sequentially reorient, feed and position connectors within a connector termination press for subsequent assembly and termination of the connectors to a conductor to form a wire harness.

We claim:

1. A connector feeding apparatus, comprising:

connector supply means for providing a plurality of connectors in a first orientation;

a drum for sequentially reorienting each connector from the first orientation where the connector is not properly oriented for termination within a connector terminator press to a second orientation where the connector is properly oriented for termination within a connector termination press, the drum including at least one connector positioning slot for receipt of the connector; and means for rotating the drum to reorient each connector from the first to the second orientation.

2. A connector feeding apparatus as set forth in claim 1, including a connector push rod means for advancing each connector from the second properly oriented position to a termination position within a connector termination press.

3. A connector feeding apparatus as set forth in claim 2, wherein the connector supply means includes a ribbon of tape mounted connectors.

4. A connector feeding apparatus as set forth in claim 3, including a connector positioning track aligned with the connector positioning slot of the drum and aligned with a ram of the connector termination press and wherein the push rod means includes a push rod mounted for reciprocal movement in line with the connector positioning track.

5. A connector feeding apparatus as set forth in claim 4, including a positive drum location means for positively locating the drum in one of a plurality of positions including a solenoid reciprocated pawl disposed to selectively engage one of a plurality of grooves in a ratchet wheel mounted for rotation with the drum to positively locate the ratchet wheel and drum.

* * * * *